United States Patent
Miller, IV et al.

(10) Patent No.: US 12,039,459 B2
(45) Date of Patent: Jul. 16, 2024

(54) SYSTEMS AND METHODS FOR A DIGITAL ECOSYSTEM

(71) Applicant: FMR LLC, Boston, MA (US)

(72) Inventors: Austin L. Miller, IV, Northborough, MA (US); Priyabrata Nandi, Sharon, MA (US); Benjamin Cutter, Dartmouth, MA (US); Jiuan Ng, Cambridge, MA (US); Subash Hewa Widana Gamage, Cary, NC (US); Chetan Mahajan, Cumberland, RI (US); Russell Scot Brocklehurst, Milford, NH (US)

(73) Assignee: FMR LLC, Boston, MA (US)

( * ) Notice: Subject to any disclaimer, the term of this patent is extended or adjusted under 35 U.S.C. 154(b) by 231 days.

(21) Appl. No.: 17/715,851

(22) Filed: Apr. 7, 2022

(65) Prior Publication Data

US 2022/0327393 A1  Oct. 13, 2022

Related U.S. Application Data

(63) Continuation-in-part of application No. 17/014,800, filed on Sep. 8, 2020, now Pat. No. 11,327,731.

(51) Int. Cl.
*G06N 5/02* (2023.01)
*G06F 8/41* (2018.01)
(Continued)

(52) U.S. Cl.
CPC ............... *G06N 5/02* (2013.01); *G06F 8/433* (2013.01); *G06F 16/26* (2019.01); *H04L 67/535* (2022.05)

(58) Field of Classification Search
CPC ...... G06N 5/02; G06N 5/022; G06Q 30/0201; G06F 8/433; G06F 9/451; G06F 16/26; G06F 16/9024; H04L 67/535
See application file for complete search history.

(56) References Cited

U.S. PATENT DOCUMENTS

| 8,966,392 B2 | 2/2015 | Antony et al. |
| 10,489,265 B2 | 11/2019 | Nitsan et al. |

(Continued)

OTHER PUBLICATIONS

Basole, Rahul C., et al., ecoxight: Discovery, Exploration, and Analysis of Business Ecosystems Using Interactive Visualization, ACM Transactions on Management Information Systems, Apr. 24, 2018, 26 pages, [retrieved on Jan. 17, 2024], Retrieved from the Internet: <URL:http://dl.acm.org/>.*

(Continued)

*Primary Examiner* — Geoffrey R St Leger
(74) *Attorney, Agent, or Firm* — Cesari & McKenna, LLP

(57) ABSTRACT

Systems and methods for aggregating a dependency structure based on application logging data, application metadata, customer intent and journey, organizational structure, and operational support information. The method includes receiving data using an application programming interface. The method further includes, for each user, determining a start point and an end point corresponding to user activity on a networked system. The method also includes, for each user, determining a task based on the start point and end point corresponding to the user activity. The method further includes, for each user, determining operations data corresponding to the user activity. The method also includes, for each user, determining a dependency structure based on the task and the operations data. The method also includes aggregating the dependency structure, the task, and the operations data into a visualization. The method further includes generating for display the visualization on a user device.

14 Claims, 18 Drawing Sheets

(51) Int. Cl.
*G06F 16/26* (2019.01)
*H04L 67/50* (2022.01)

(56) References Cited

U.S. PATENT DOCUMENTS

| | | |
|---|---|---|
| 10,594,576 B2 | 3/2020 | Cavuto et al. |
| 10,657,553 B2 | 5/2020 | McGuire |
| 11,010,703 B2 | 5/2021 | Balugari et al. |
| 2011/0029480 A1 | 2/2011 | DeLucia |
| 2013/0055145 A1 | 2/2013 | Antony et al. |
| 2017/0093645 A1 | 3/2017 | Zhong et al. |
| 2017/0132650 A1 | 5/2017 | McGuire |
| 2017/0308837 A1 | 10/2017 | Balugari et al. |
| 2018/0032514 A1* | 2/2018 | Venkataraman .... G06F 16/3344 |
| 2018/0089051 A1 | 3/2018 | Nitsan et al. |
| 2018/0218042 A1* | 8/2018 | Krishnan ............ G06F 16/2455 |
| 2018/0219751 A1 | 8/2018 | Cavuto et al. |
| 2018/0287876 A1 | 10/2018 | Strobel et al. |
| 2018/0315061 A1 | 11/2018 | Brown et al. |
| 2020/0293564 A1 | 9/2020 | Reh et al. |

OTHER PUBLICATIONS

Padua, Donatella, The Digital Ecosystem, Digital Cultural Transformation, 2021, pp. 89-136, [retrieved on Jan. 17, 2024], Retrieved from the Internet: <URL:https://link.springer.com/chapter/10.1007/978-3-030-83803-4_4>.*

Van Den Berk, I., et al., "Software Ecosystems: A Software Ecosystem Strategy Assessment Model," ECSA '10: Proceedings of the Fourth European Conference on Software Architecture: Companion Volume, Aug. 2010, pp. 127-134.

Faber, A., et al., "Visualizing an Emerging Mobility Business Ecosystem," 2018 IEEE 5th International Congress on Information Science and Technology (CIST), Oct. 21-27, 2018, pp. 88-93.

I. Van Den Berk et al., "Software Ecosystems: A Software Ecosystem Strategy Assessment Model," ECSA '10: Proceedings of the Fourth European Conference on Software Architecture: Companion Volume, Aug. 2010, pp. 127-134.

A. Faber et al., "Visualizing an Emerging Mobility Business Ecosystem," 2018 IEEE Fifth International Congress on Information Science and Technology (CISt), Oct. 21-27, 2018, pp. 88-93.

* cited by examiner

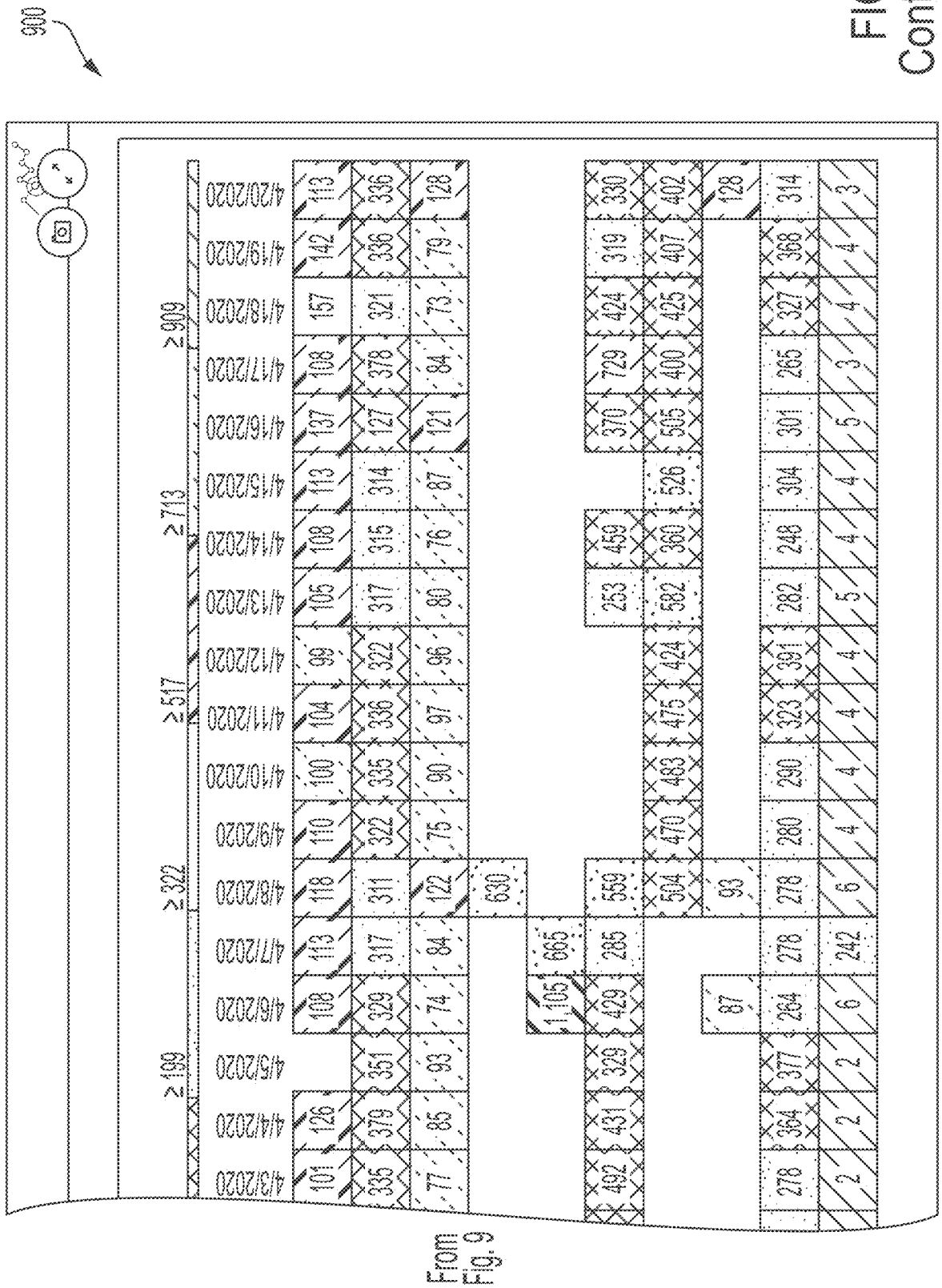

SYSTEMS AND METHODS FOR A DIGITAL ECOSYSTEM

RELATED APPLICATION(S)

This application is a continuation-in-part of U.S. patent application Ser. No. 17/014,800, filed on Sep. 8, 2020, the entirety of which is incorporated herein by reference.

FIELD OF THE INVENTION

The present invention relates generally to systems and methods for visualizing a digital ecosystem, including systems and methods for aggregating and visualizing a dependency structure within a digital ecosystem.

BACKGROUND OF THE INVENTION

Consumer-facing organizations often rely on various types of computing technologies and services as part of their computing infrastructure or digital ecosystem. When a consumer uses a front-end application to interact with an organization, various back-end technologies and services are required to accomplish a seamless interaction. Some of those back-end technologies and services are cloud-based, while others may be locally-based where the consumer is using the front-end application. Organizations often use software-based tools to manage their computing infrastructure and address issues that may arise.

However, managing an organization's digital ecosystem depends on the collection and aggregation of a large amount of log data. In addition, software-based tools often lack a clear dependency structure between the consumer, the front-end applications, and the back-end technologies and services. An understanding of the dependency structure of an organization's digital ecosystem can be critical to addressing technical issues and improving the consumer's experience. Consequently, there is a need for a better solution to visualize and manage an organization's digital ecosystem using log data and organizational information.

SUMMARY OF THE INVENTION

Accordingly, an object of the invention is to provide systems and methods for aggregating and visualizing a dependency structure within a digital ecosystem. It is an object of the invention to provide systems and methods for aggregating a dependency structure based on application logging data, application metadata, customer intent and journey, organizational structure, and operational support information. It is an object of the invention to provide systems and methods for generating for display visualization data corresponding to a dependency structure of a digital ecosystem. It is an object of the invention to provide systems and methods for determining a latency corresponding to an application within a digital ecosystem. It is an object of the invention to provide systems and methods for determining a success rate and an error rate corresponding to an application within a digital ecosystem.

In some aspects, a method for aggregating a dependency structure includes receiving, by a server computing device, data from data sources using an application programming interface. The received data includes application logging data, application metadata, customer intent and journey data, organizational structure data, and operational support data. The method further includes, for each user, determining, by the server computing device, a start point and an end point corresponding to user activity on a networked system based on the received data. The method also includes, for each user, determining, by the server computing device, a task based on the start point and end point corresponding to the user activity.

The method also includes, for each user, determining, by the server computing device, operations data corresponding to the user activity based on the received data. Further, the method includes, for each user, determining, by the server computing device, a dependency structure based on the task and the operations data corresponding to the user activity. The method also includes, aggregating, by the server computing device, the dependency structure, the task, and the operations data for the users into a visualization. Further, the method includes generating, by the server computing device, for display the visualization data on a user device.

In some embodiments, the server computing device is further configured to receive the application logging data, application metadata, customer intent and journey data, organizational structure data, and operational support data periodically. In some embodiments, the server computing device is further configured to identify an organizational group responsible for the task based on the operations data.

In some embodiments, the server computing device is further configured to identify ownership data corresponding to an application used by a user. In some embodiments, the server computing device is further configured to determine a latency corresponding to the application. For example, in some embodiments, the server computing device is further configured to determine whether the latency corresponding to the application is below a threshold. In some embodiments, the server computing device is further configured to generate a notification in response to determining that the latency is below the threshold.

In some embodiments, the server computing device is further configured to determine a success rate and an error rate corresponding to the application. For example, in some embodiments, the server computing device is further configured to determine whether the success rate and the error rate corresponding to the application is below a threshold. In some embodiments, the server computing device is further configured to generate a notification in response to determining that the success rate and the error rate are below the threshold.

In some aspects, a system for aggregating a dependency structure includes a server computing device communicatively coupled to a database and a user device over a network. The server computing device is configured to receive data from data sources using an application programming interface. The received data includes application logging data, application metadata, customer intent and journey data, organizational structure data, and operational support data. The server computing device is also configured to, for each user, determine a start point and an end point corresponding to user activity on the network based on the received data. Further, the server computing device is configured to, for each user, determine a task based on the start point and end point corresponding to the user activity.

The server computing device is also configured to, for each user, determine operations data corresponding to the user activity based on the received data. Further, the server computing device is configured to, for each user, determine a dependency structure based on the task and the operations data corresponding to the user activity. The server computing device is further configured to, aggregate the dependency structure, the task, and the operations data for the users into a visualization. The server computing device is also configured to generate for display the visualization on the user device.

In some embodiments, the server computing device is further configured to receive the application logging data, application metadata, customer intent and journey data, organizational structure data, and operational support data periodically. In some embodiments, the server computing device is further configured to identify an organizational group responsible for the task based on the operations data.

In some embodiments, the server computing device is further configured to identify ownership data corresponding to an application used by a user. In some embodiments, the server computing device is further configured to determine a latency corresponding to the application. For example, in some embodiments, the server computing device is further configured to determine whether the latency corresponding to the application is below a threshold. In some embodiments, the server computing device is further configured to generate a notification in response to determining that the latency is below the threshold.

In some embodiments, the server computing device is further configured to determine a success rate and an error rate corresponding to the application. For example, in some embodiments, the server computing device is further configured to determine whether the success rate and the error rate corresponding to the application is below a threshold. In some embodiments, the server computing device is further configured to generate a notification in response to determining that the success rate and the error rate are below the threshold.

In some aspects, a computerized method of generating and visualizing a knowledge graph using a dependency structure based on application logging data, application metadata, customer intent and journey, organizational structure, and operational support information is provided. A server computing device analyzes an aggregated dependency structure for a computing ecosystem, the aggregated dependency structure based upon data from a plurality of data sources, wherein the data comprises application logging data, application metadata, customer intent and journey data, organizational structure data, and operational support data. The server computing device generates a knowledge graph based upon the analysis of the aggregated dependency structure, the knowledge graph comprising a plurality of nodes connected via one or more relationships. The server computing device traverses the knowledge graph to generate a result set responsive to a graph query, the graph query generated via conversion of a question-and-answer-pattern received from a remote computing device. The server computing device creates a visualization based upon the result set, the visualization comprising a graphical representation of at least a portion of the knowledge graph. The server computing device generates for display the visualization on a user device.

In some aspects, a system for generating and visualizing a knowledge graph using a dependency structure based on application logging data, application metadata, customer intent and journey, organizational structure, and operational support information includes a server computing device that analyzes an aggregated dependency structure for a computing ecosystem, the aggregated dependency structure based upon data from a plurality of data sources, wherein the data comprises application logging data, application metadata, customer intent and journey data, organizational structure data, and operational support data. The server computing device generates a knowledge graph based upon the analysis of the aggregated dependency structure, the knowledge graph comprising a plurality of nodes connected via one or more relationships. The server computing device traverses the knowledge graph to generate a result set responsive to a graph query, the graph query generated via conversion of a question-and-answer-pattern received from a remote computing device. The server computing device creates a visualization based upon the result set, the visualization comprising a graphical representation of at least a portion of the knowledge graph. The server computing device generates for display the visualization on a user device.

In some embodiments, the server computing device receives the application logging data, application metadata, customer intent and journey data, organizational structure data, and operational support data periodically. In some embodiments, each node of the knowledge graph is associated with one or more of an application resource, a task, a customer intent and journey, or a back-end resource. In some embodiments, a connection between two nodes of the knowledge graph comprises a dependency. In some embodiments, each node of the knowledge graph comprises one or more attributes corresponding to a subject-predicate-object triple.

In some embodiments, the server computing device converts the question-and-answer-pattern into the graph query using a Natural Language Processing (NLP) interface. In some embodiments, the server computing device generates the aggregated dependency structure by: for each of a plurality of users, determining, by the server computing device, a start point and an end point corresponding to user activity on a networked system based on the received data; for each of the plurality of users, determining, by the server computing device, a task based on the start point and end point corresponding to the user activity; for each of the plurality of users, determining, by the server computing device, operations data corresponding to the user activity based on the received data; for each of the plurality of users, determining, by the server computing device, a dependency structure based on the task and the operations data corresponding to the user activity; for each of the plurality of users, identifying, by the server computing device, an organizational group responsible for the task based on the operations data; for each of the plurality of users, identifying, by the server computing device, ownership data corresponding to an application used by a user of the plurality of users, including determining a latency corresponding to the application and when the latency is below a threshold, generating a notification; and aggregating, by the server computing device, the dependency structure, the task, the operations data, and the organizational group responsible for the task for the plurality of users into the aggregated dependency structure.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for aggregating and visualizing a dependency structure within a digital ecosystem. The system and methods can include mechanisms or methods for aggregating a dependency structure based on application logging data, application metadata, customer intent and journey, organizational structure, and operational support information. The systems and methods described herein can provide systems and methods for generating for display visualization data corresponding to a dependency structure of a digital ecosystem. The systems and methods described herein can include one or more mechanisms or methods for determining a latency corresponding to an application within a digital ecosystem. The systems and methods described herein can facilitate users with systems and methods for determining a success rate and an error rate corresponding to an application within a digital ecosystem.

Figure 1:
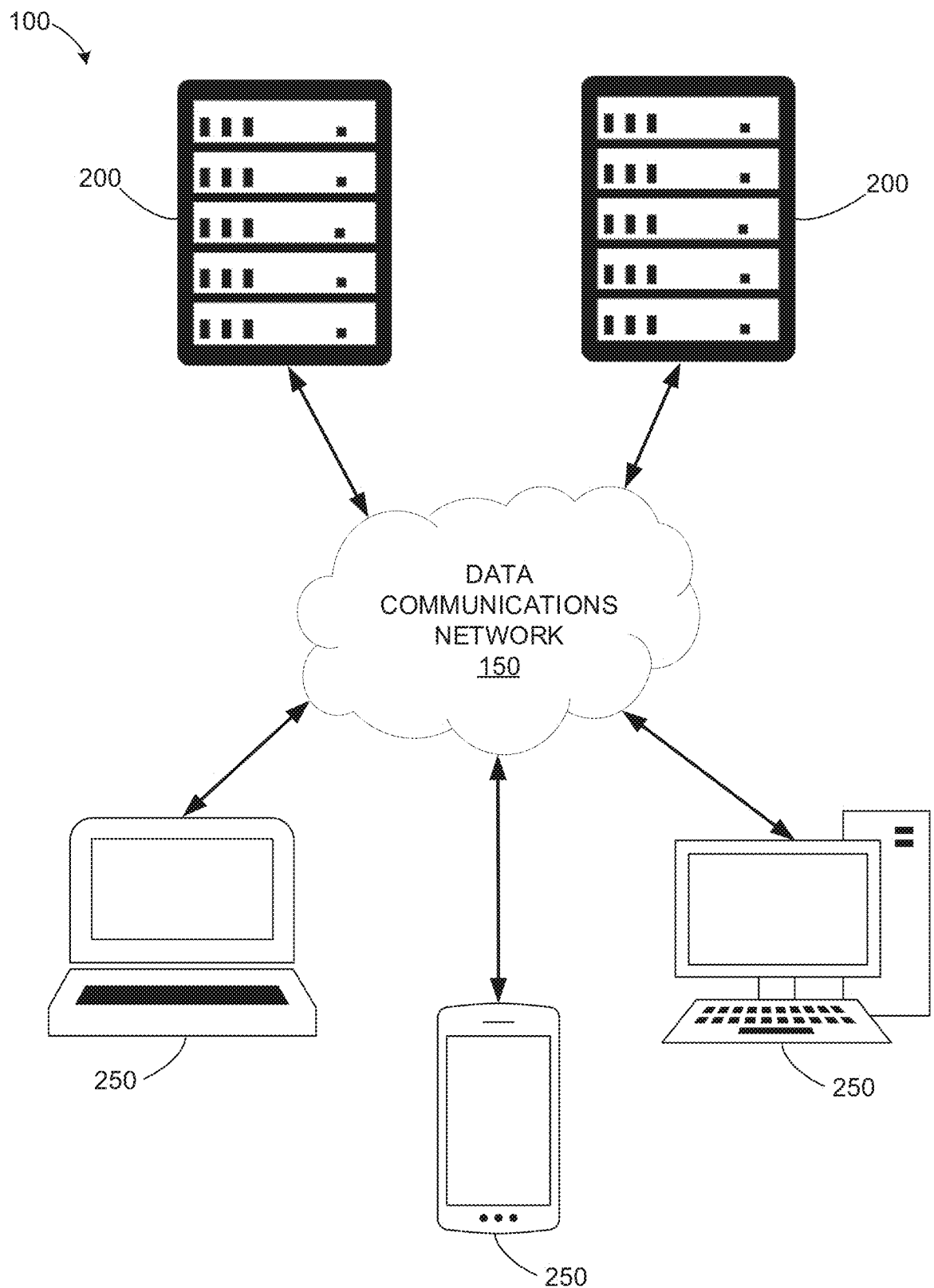
FIG. 1 is a block diagram of an exemplary data communications network, according to embodiments of the technology described herein.
Figure 2:
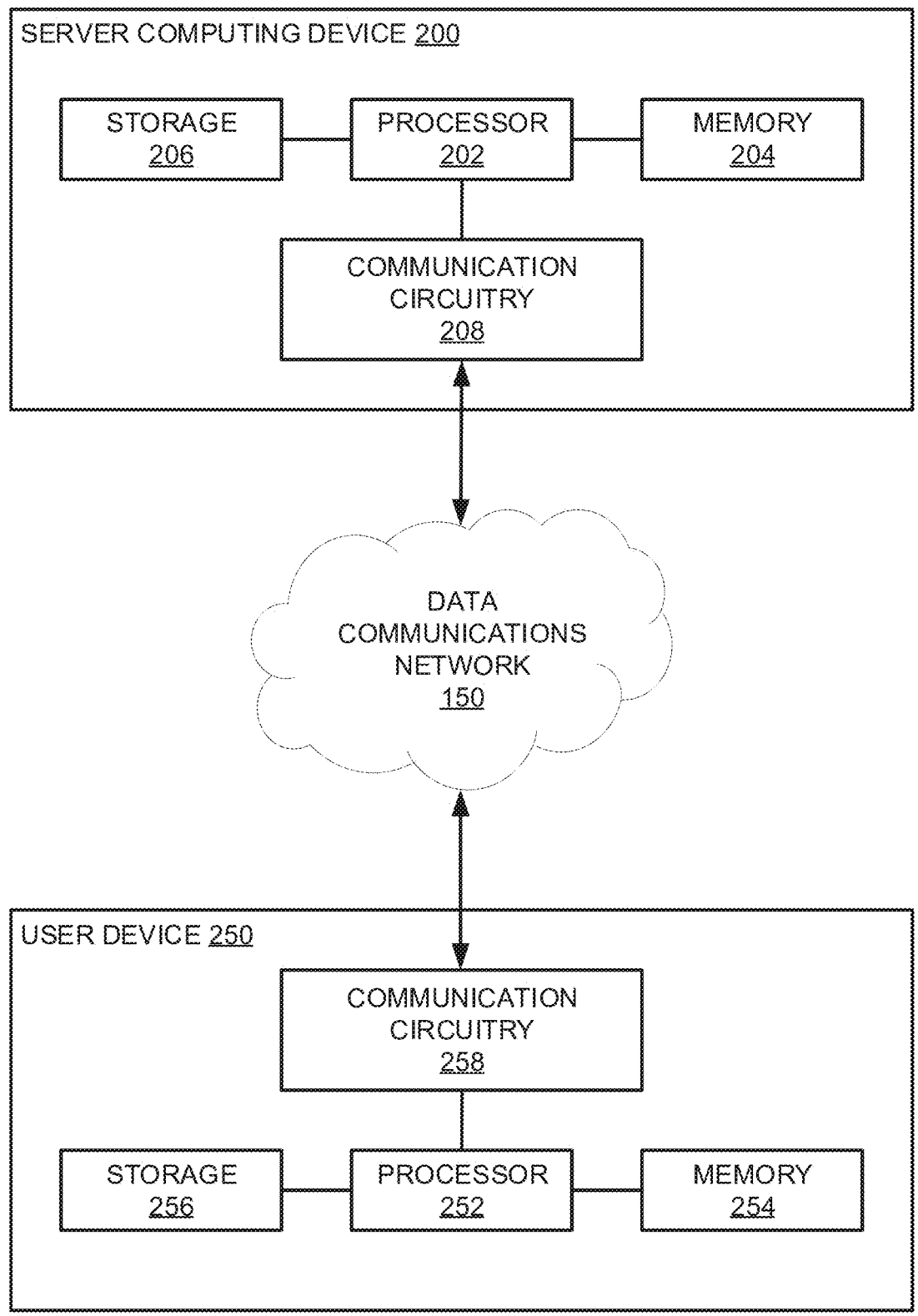
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

Figure 3:
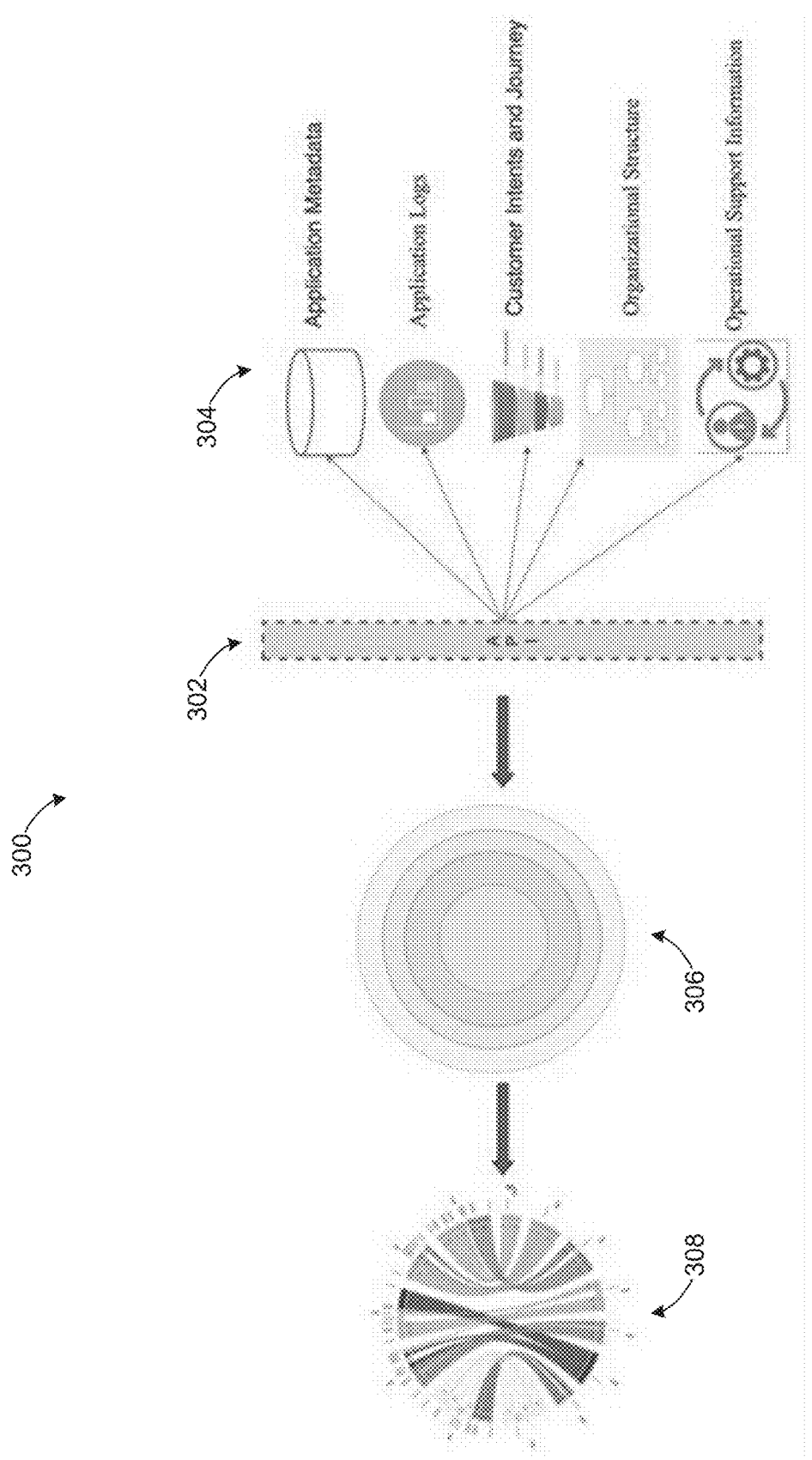
FIG. 3 is a diagram showing a visualization of an exemplary digital ecosystem architecture for aggregating and visualizing a dependency structure, according to embodiments of the technology described herein.

An exemplary digital ecosystem architecture 300 for aggregating and visualizing a dependency structure is illustrated in FIG. 3. The digital ecosystem architecture 300 provides an in-depth view of client digital journeys by stitching capabilities and their backend services to show the interconnectivity of legacy and digital assets. Digital ecosystem architecture 300 includes an API 302 that collects log data and application data from various data sources 304. Using the log data and application data, the digital ecosystem architecture 300 includes an aggregation 306 of the data to create a dependency structure between the front-end applications and back-end technologies and services. The digital ecosystem architecture 300 also includes a visualization 308 of the aggregation 306. The visualization 308 extends beyond experiences and is augmented by rich information about the applications like ownership, organizational alignment model, technology stack, technology lifecycle management, and operational metrics.

Figure 4:
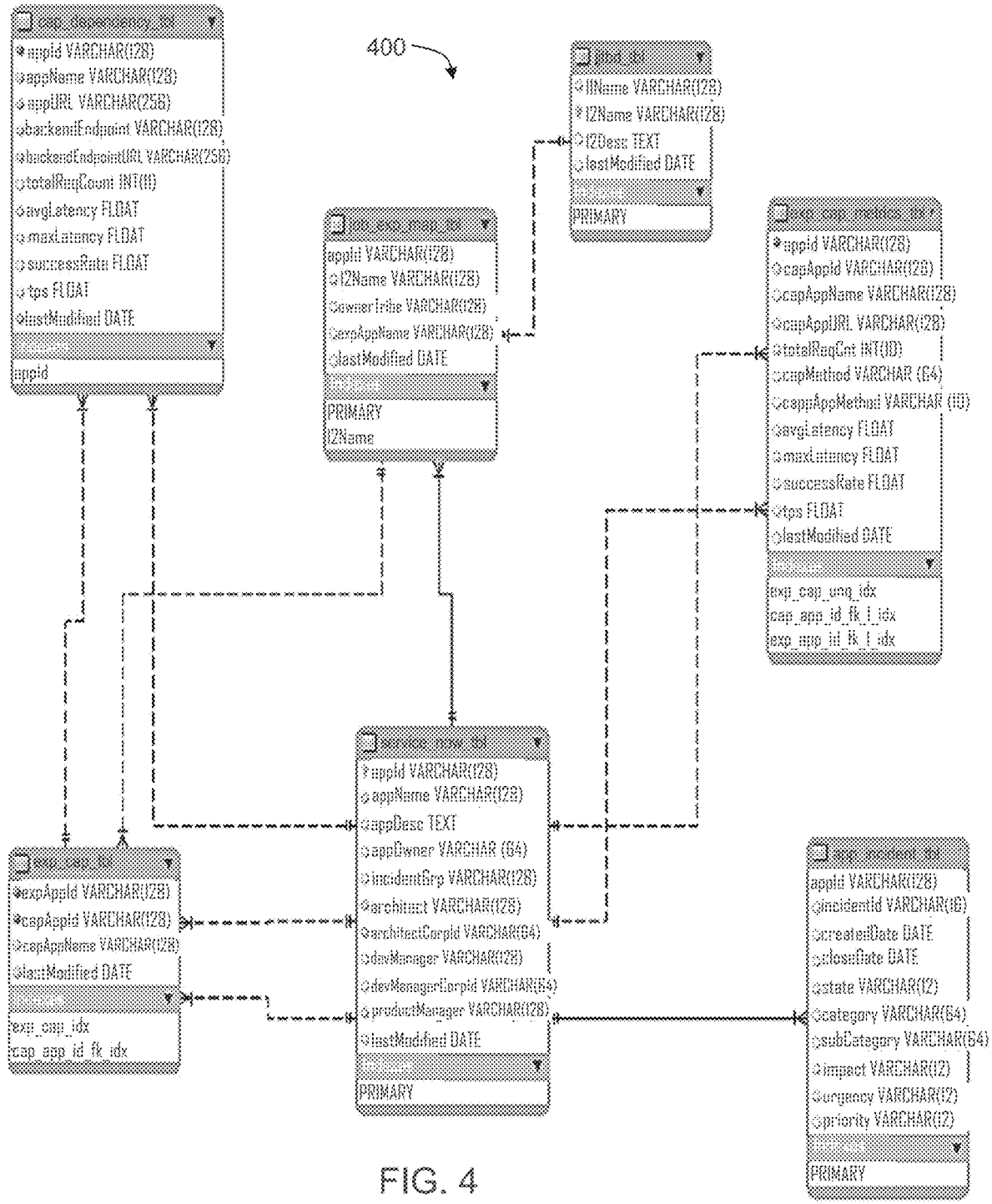
FIG. 4 is a diagram showing a visualization of an exemplary digital ecosystem model for aggregating and visualizing a dependency structure, according to embodiments of the technology described herein.

Referring to FIG. 4, an exemplary digital ecosystem model 400 for aggregating and visualizing a dependency structure using digital ecosystem architecture 300 is illustrated. The digital ecosystem model 400 can be implemented using communications system 100, data communications network 150, server computing devices 200, and user devices 250. The digital ecosystem model 400 is agnostic to the underlining infrastructure so it can be applied to local technologies and/or to cloud-enabled technologies. The digital ecosystem model 400 focuses on exposing complex experience mappings by providing a clear dependency structure between front-end applications, capabilities and back end services. As described further in relation to FIGS. 5A and 5B, below, the data is scrapped through logs at a set frequency and then aggregated to form a visual diagram of the dependencies between the layers. As described further in relation to FIGS. 6-9, below, the visualization and dependency graph allows users to view the connections both upstream and downstream. In addition, the digital ecosystem model 400 enables functionality such as invoking triggers to triage stability and redundancy identification to simplify and reduce costs.

The digital ecosystem model 400 relies on application logging information rather than dated diagrams and architecture maps to understand the interconnectivity of applications, capabilities and back-end points. The ingested log information is used to depict a clear picture of the dependencies between the upstream and downstream systems. It allows experience owners to understand how various layers are interconnected and find out the ownership of those dependent applications. The digital ecosystem model 400 facilitates quicker speed to market when deploying new products or experiences by making it easier to identify application owners. This in turn also helps to reduce backlog decoupling by connecting these parties. The digital ecosystem model 400 also provides a clear visual to understand application dependencies while triaging a production incident and helps identify technology components at end of life that require upgrading.

Figure 5A:
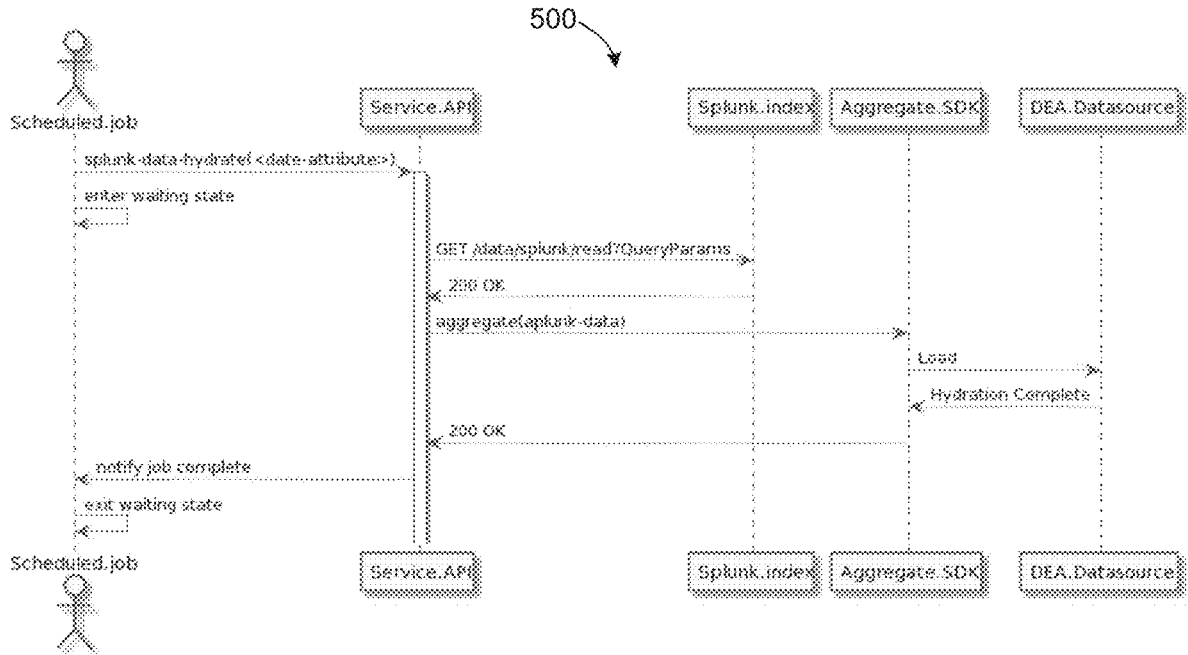
FIGS. 5A and 5B are diagrams showing a visualization of an exemplary process for data hydration within the digital ecosystem, according to embodiments of the technology described herein.
Figure 5B:
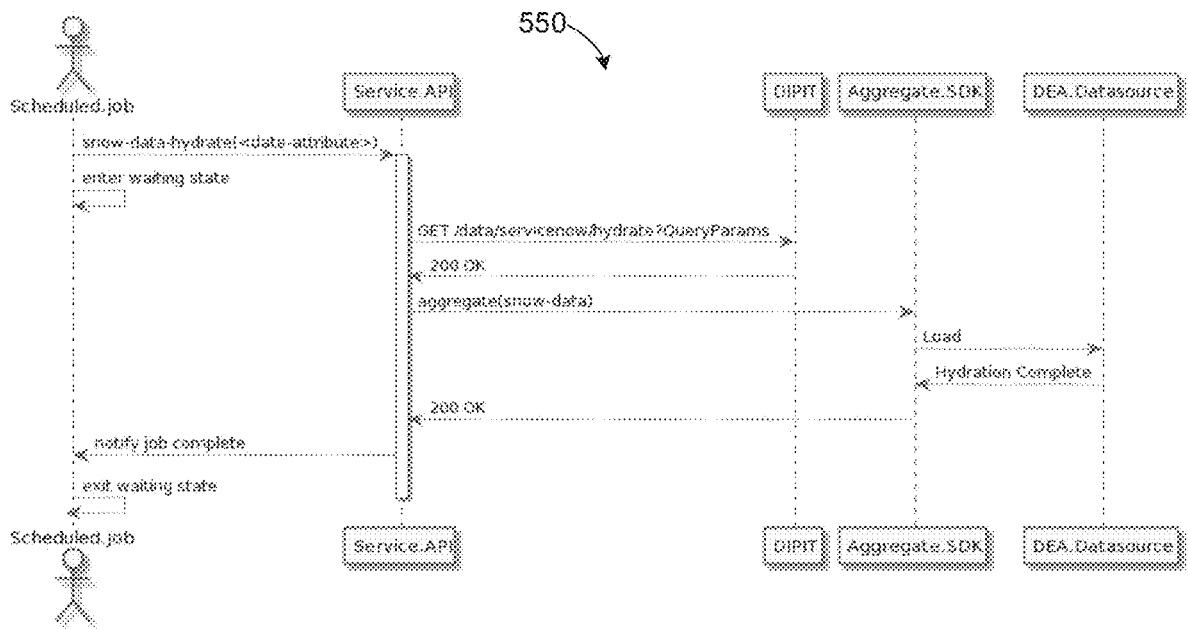

Exemplary processes 500 and 550 for log data and application data hydration using digital ecosystem model 400 are illustrated in FIGS. 5A and 5B, respectively. The process 500 receives log data from data sources 304 using an application programming interface 302. Process 500 can be performed by a server computing device 200. The log data includes customer intent and journey data. The server computing device 200 can be configured to receive the customer intent and journey data periodically. For example, the server computing device 200 can receive the customer intent and journey data once a day, every hour, or every minute.

The process 550 receives application data from data sources 304 using an application programming interface 302. Process 550 can be performed by a server computing device 200. The application data includes application logging data, application metadata, organizational structure data, and operational support data. The server computing device 200 can be configured to receive the application logging data, application metadata, organizational structure data, and operational support data periodically. For example, the server computing device 200 can receive the application logging data, application metadata, organizational structure data, and operational support data once a day, every hour, or every minute.

Figure 6:
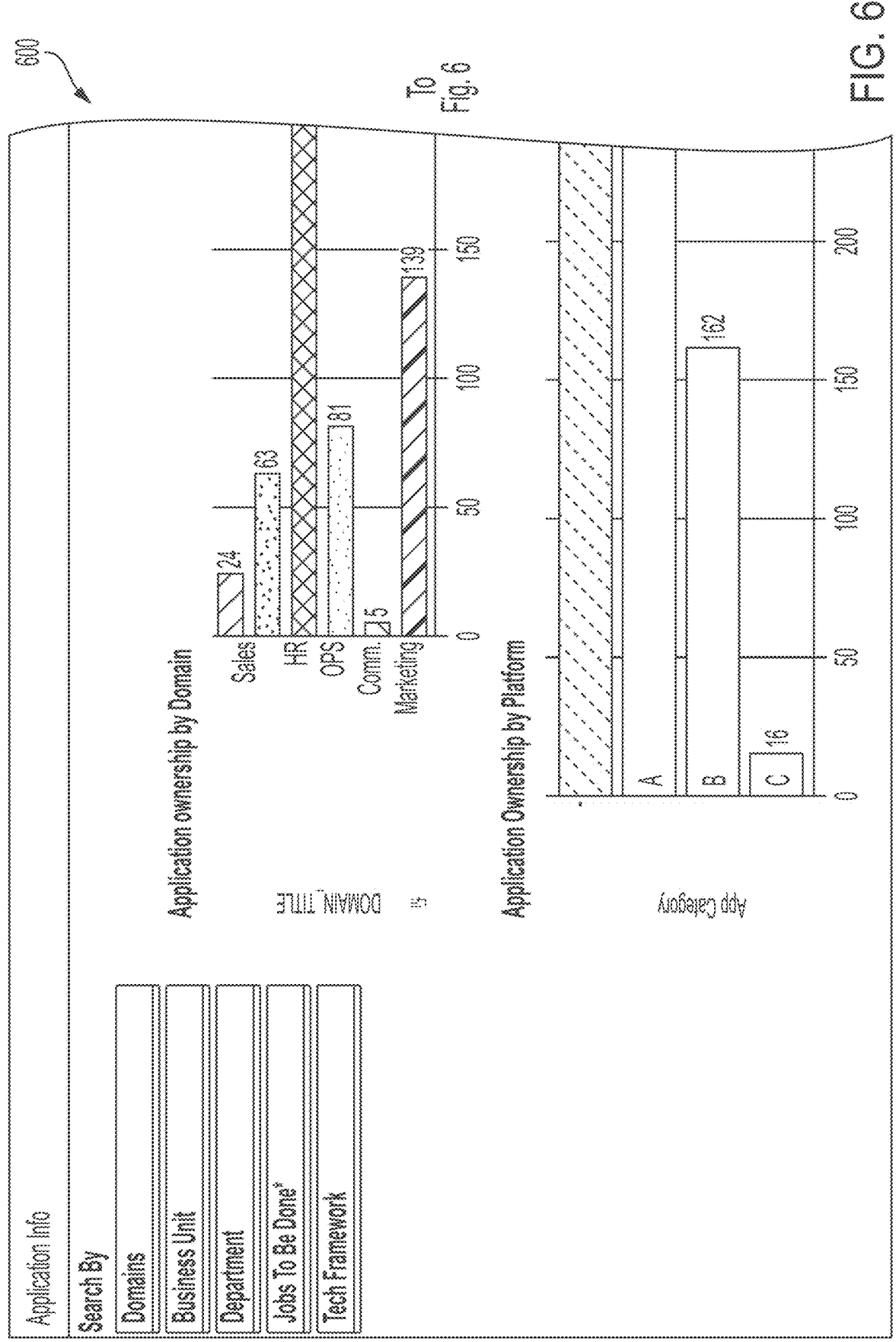
FIG. 6 is a diagram showing a visualization of an exemplary digital ecosystem visualizing application data, according to embodiments of the technology described herein.
Figure 6:
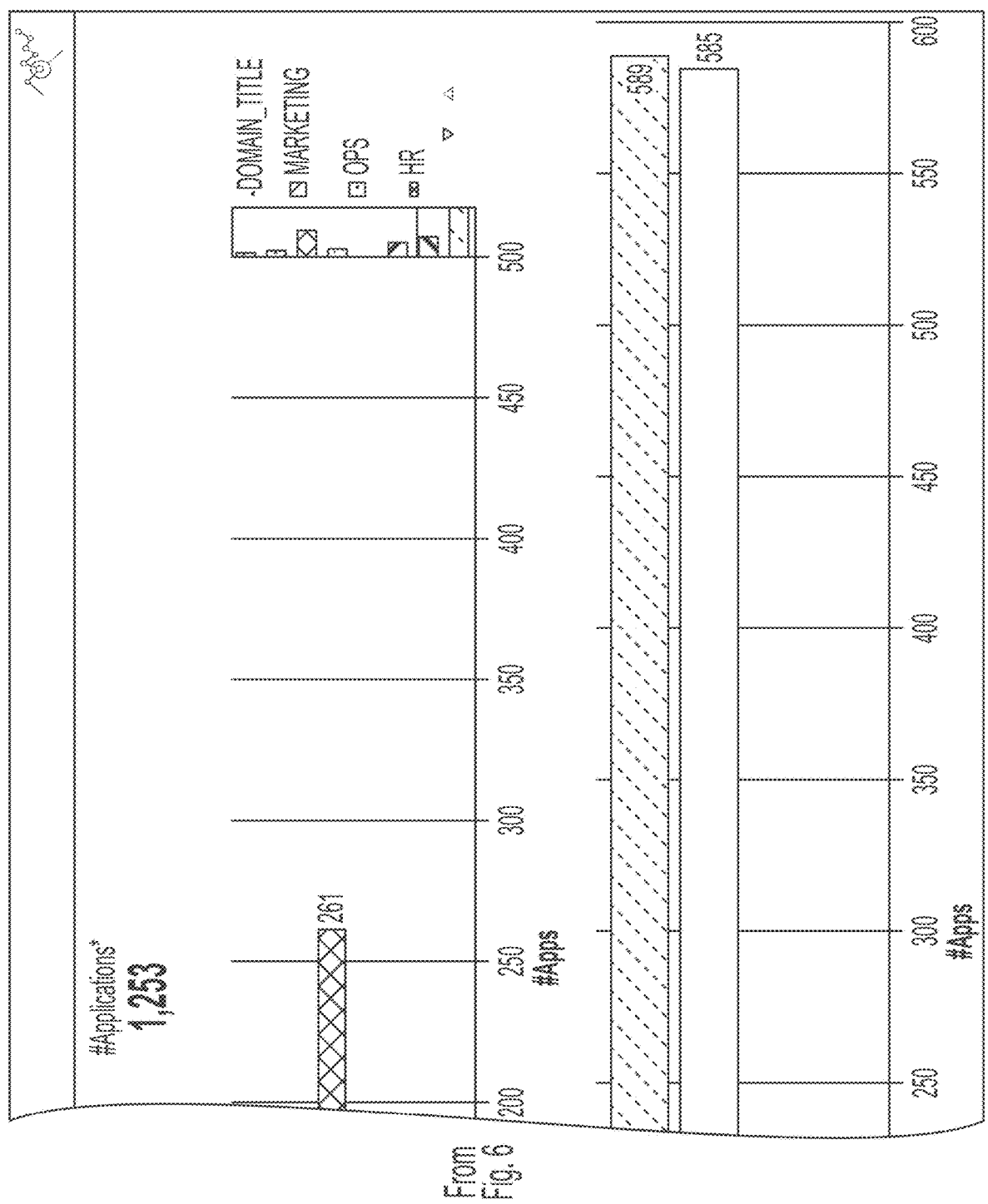

Exemplary visualizations 308 are further illustrated in relation to FIGS. 6-9. A visualization 600 of exemplary digital ecosystem application data is illustrated in FIG. 6. Visualization 600 provides information about application ownership by domain and/or by platform. For example, visualization 600 can illustrate the amount of applications that can be categorized into the digital planning and advice domain, the digitization of client servicing domain, the independent investors domain, the lifetime engagement domain, and/or the marketing domain.

Figure 7:
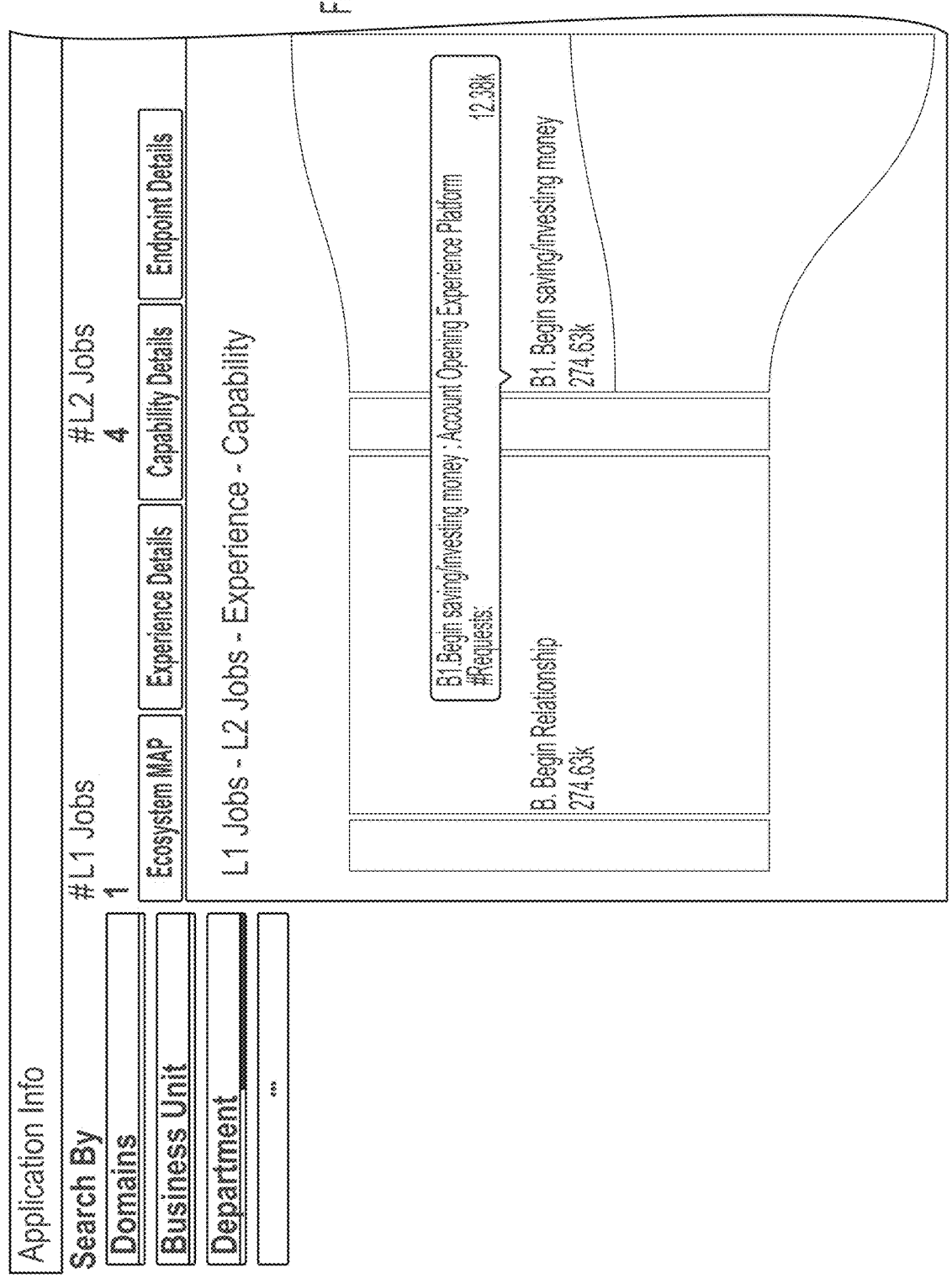
FIG. 7 is a diagram showing a visualization of an exemplary digital ecosystem visualizing an interconnectivity dependency matrix, according to embodiments of the technology described herein.
Figure 7:
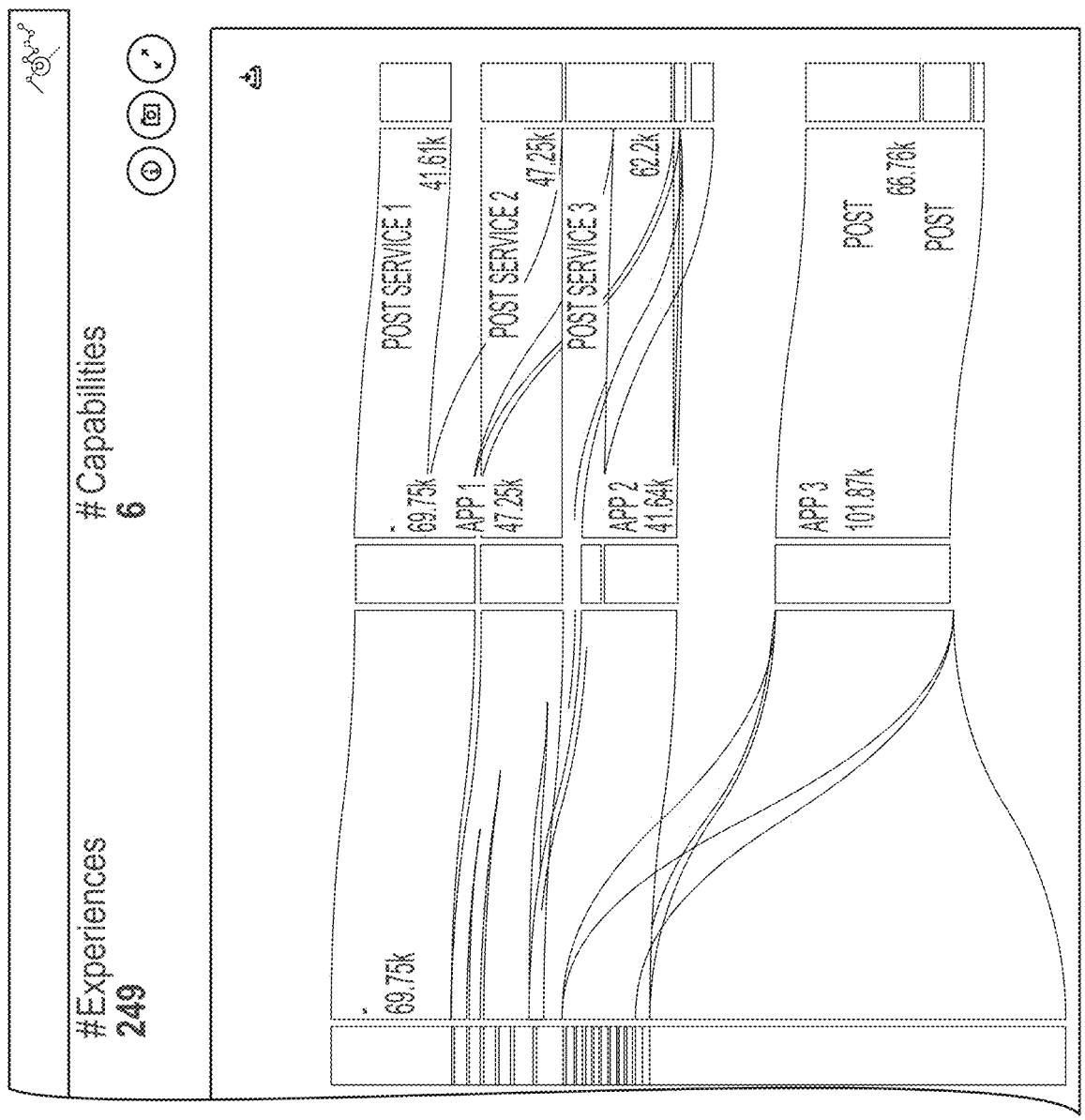

FIG. 7 is a diagram showing a visualization 700 of an exemplary digital ecosystem interconnectivity dependency matrix. For example, the digital ecosystem model 400 can determine a start point and an end point corresponding to user activity on a networked system based on the received data from processes 500 and 550. The digital ecosystem model can then determine a task based on the start point and end point corresponding to the user activity and determine operations data corresponding to the user activity based on the received data. The digital ecosystem model 400 can then determine a dependency structure based on the task and the operations data corresponding to the user activity and aggregate the dependency structure, the task, and the operations data for the users into visualization 700.

Figure 8:
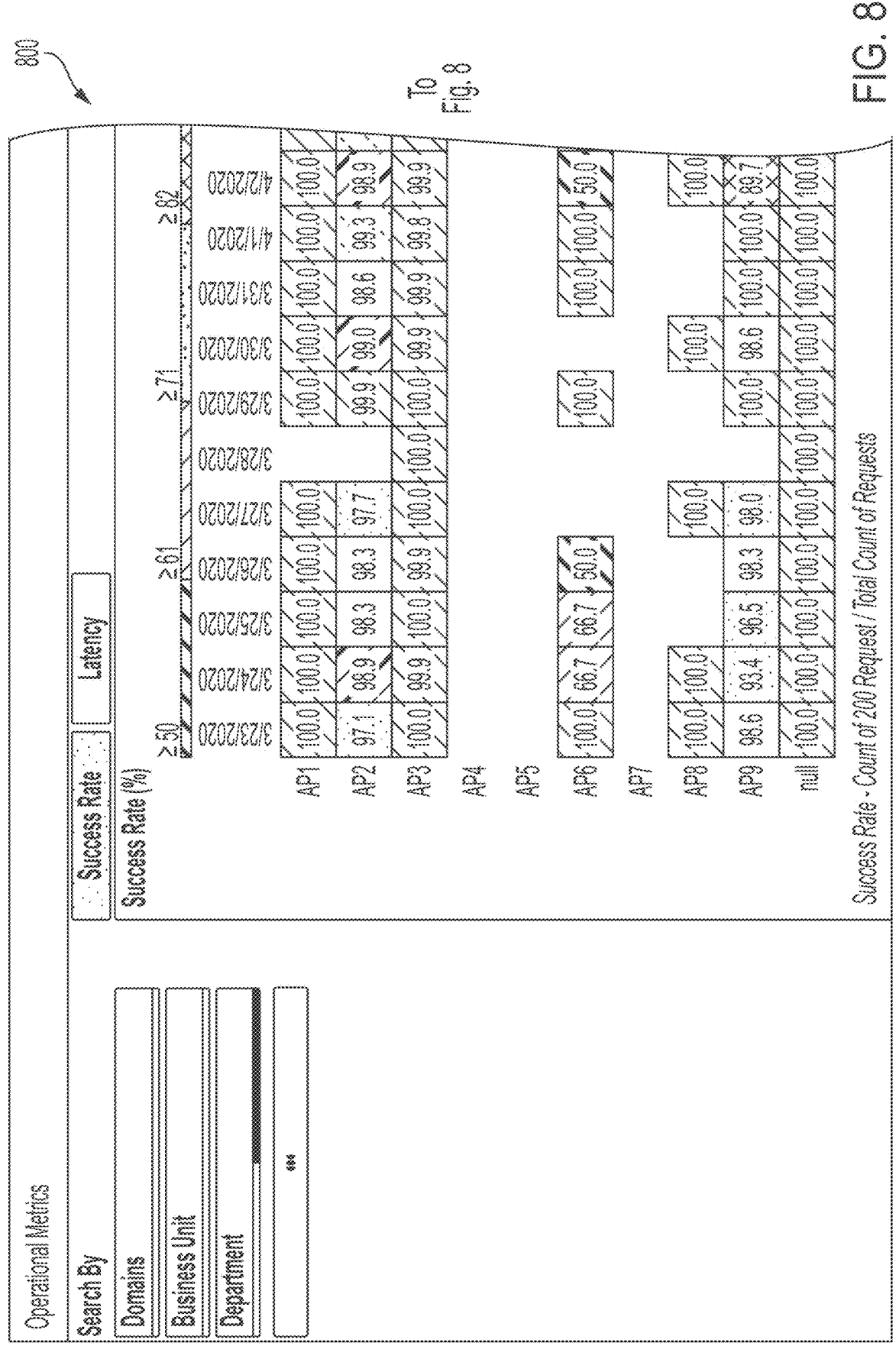
FIG. 8 is a diagram showing a visualization of an exemplary digital ecosystem visualizing application success rate, according to embodiments of the technology described herein.
Figure 8:
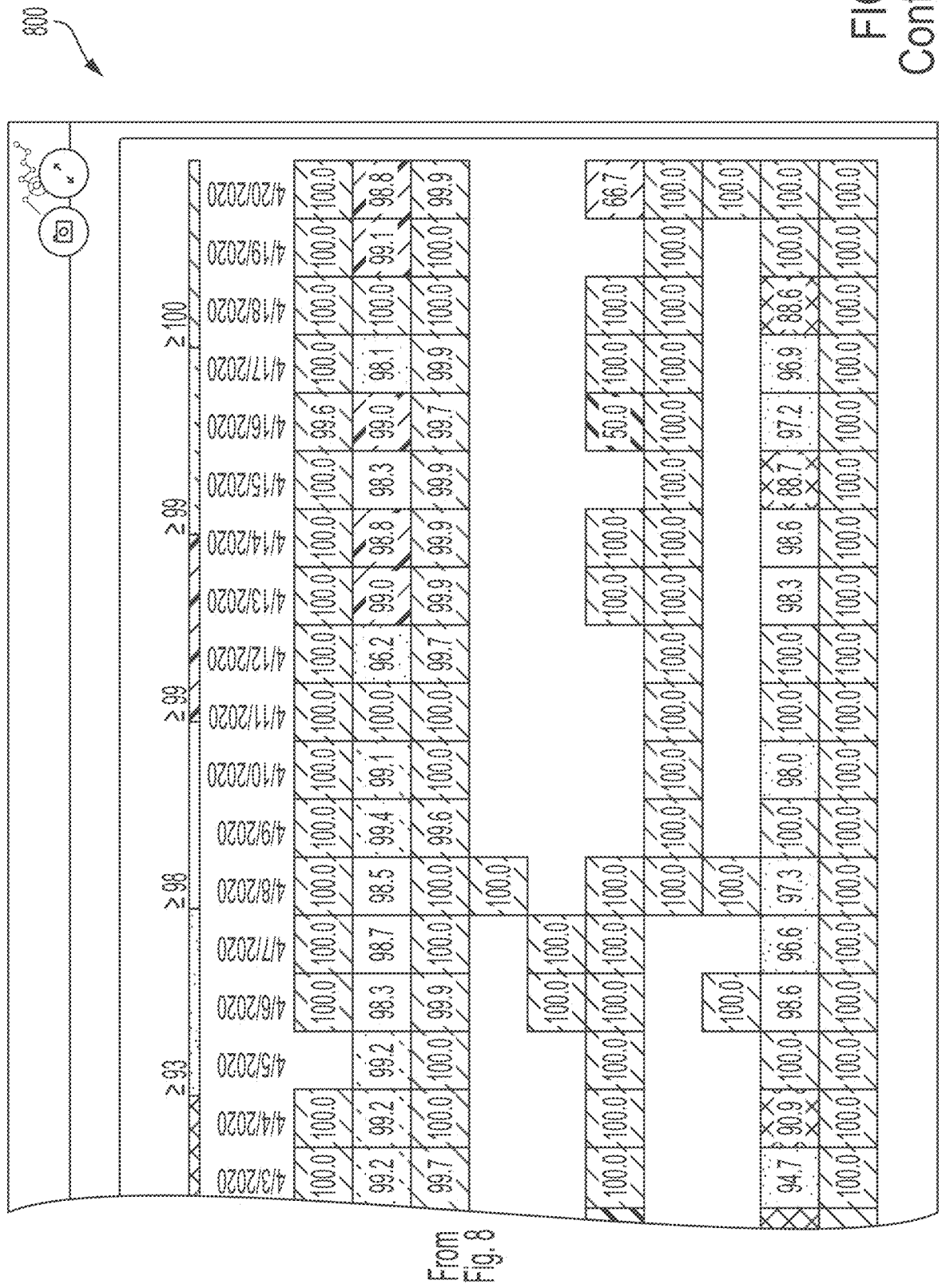

A visualization 800 of exemplary digital ecosystem application success rate data is illustrated in FIG. 8. For example, the digital ecosystem model 400 can determine a success rate and an error rate corresponding to an application and determine whether the success rate and the error rate corresponding to the application is below a threshold. The digital ecosystem model 400 can then generate visualization 800 including the success and error rates corresponding to the applications. Visualization 800 can include one or more notifications in response to determining that the success rate and the error rate are below the threshold.

Figure 9:
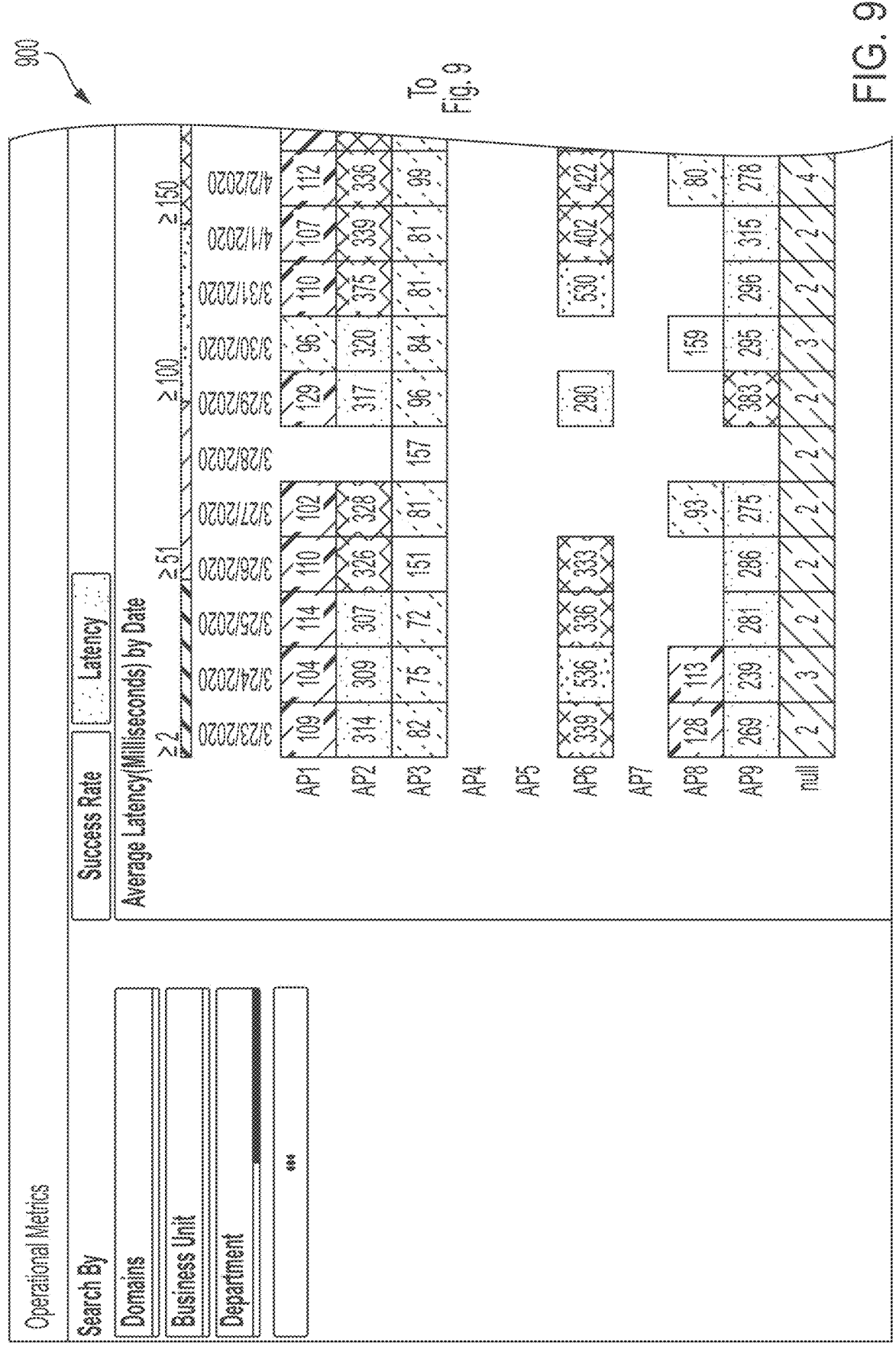
FIG. 9 is a diagram showing a visualization of an exemplary digital ecosystem visualizing application latency, according to embodiments of the technology described herein.

FIG. 9 is a diagram showing a visualization 900 of exemplary digital ecosystem application latency data. For example, the digital ecosystem model 400 can identify ownership data corresponding to an application used by one of the users and determine a latency corresponding to the application. The digital ecosystem model 400 can then determine whether the latency corresponding to the application is below a threshold. The digital ecosystem 400 can then generate visualization 900 including the latency corresponding to the applications. Visualization 900 can include one or more notifications in response to determining that the latency is below the threshold.

Figure 10:
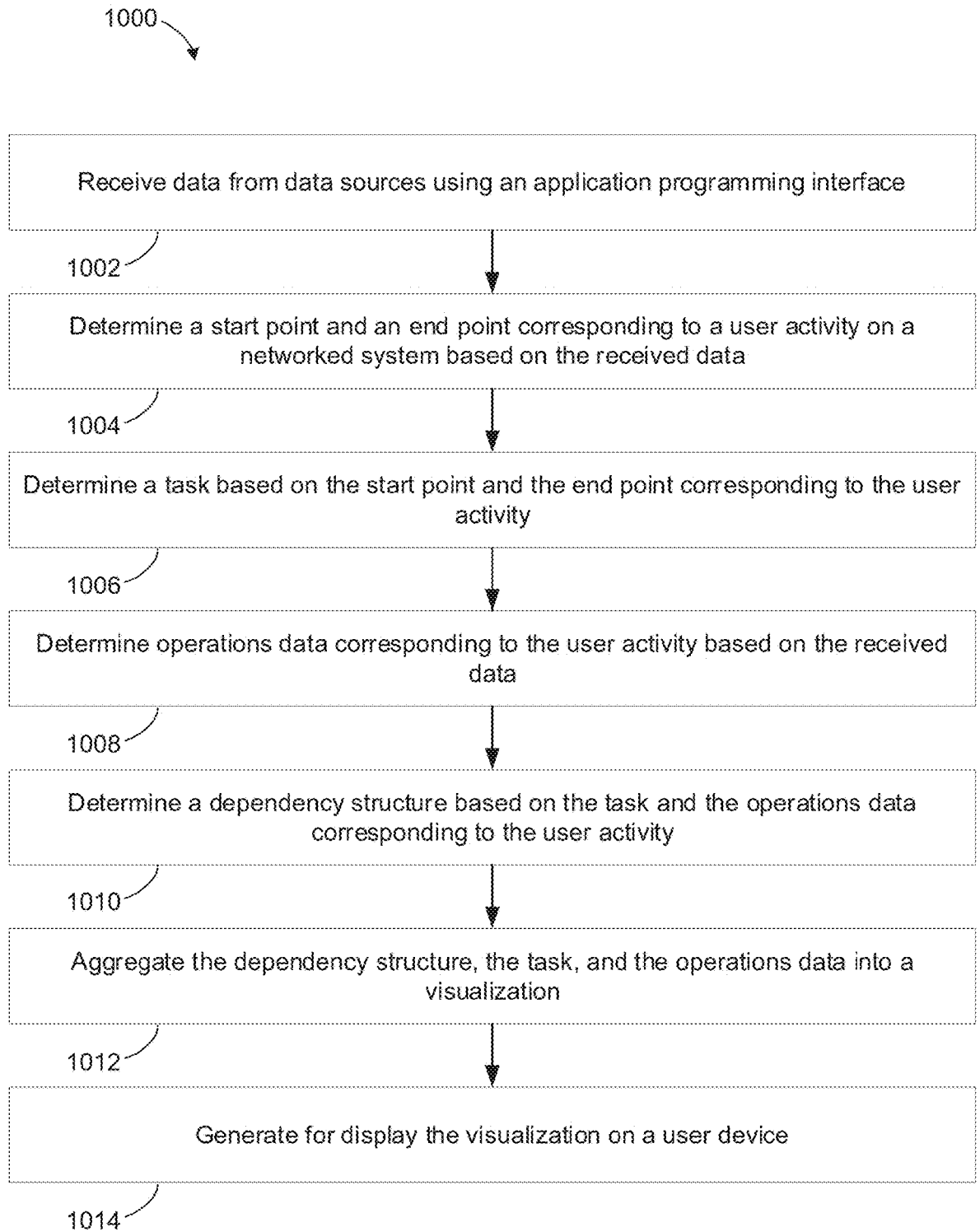
FIG. 10 is a flow diagram of a computer-implemented method for aggregating a dependency structure based on application logging data, application metadata, customer intent and journey, organizational structure, and operational support information, according to embodiments of the technology described herein.

Referring to FIG. 10, a process 1000 for aggregating a dependency structure based on application logging data, application metadata, customer intent and journey, organizational structure, and operational support information is illustrated. The process 1000 begins by receiving, by a server computing device 200, data from data sources using an application programming interface in step 1002. The data including application logging data, application metadata, customer intent and journey data, organizational structure data, and operational support data. In some embodiments, the server computing device 200 is further configured to receive the application logging data, application metadata, customer intent and journey data, organizational structure data, and operational support data periodically.

Process 1000 continues by, for each of at least one user, determining, by the server computing device 200, a start point and an end point corresponding to user activity on a networked system based on the received data in step 1004. Process 1000 continues by, for each of the users, determining, by the server computing device 200, a task based on the start point and end point corresponding to the user activity in step 1006. Process 1000 continues by, for each of the users, determining, by the server computing device 200, operations data corresponding to the user activity based on the received data in step 1008. In some embodiments, the server computing device 200 is further configured to identify an organizational group responsible for the task based on the operations data.

Process 1000 continues by, for each of the users, determining, by the server computing device 200, a dependency structure based on the task and the operations data corresponding to the user activity in step 1010. Process 1000 continues by, aggregating, by the server computing device 200, the dependency structure, the task, and the operations data for the users into a visualization in step 1012. Process 1000 finishes by generating, by the server computing device 200, for display the visualization on a user device 250 in step 1014.

In some embodiments, the server computing device 200 is further configured to identify ownership data corresponding to an application used by one of the users. In some embodiments, the server computing device 200 is further configured to determine a latency corresponding to the application. For example, in some embodiments, the server computing device 200 is further configured to determine whether the latency corresponding to the application is below a threshold. In some embodiments, the server computing device 200 is further configured to generate a notification in response to determining that the latency is below the threshold.

In other embodiments, the server computing device 200 is further configured to determine a success rate and an error rate corresponding to the application. For example, in some embodiments, the server computing device 200 is further configured to determine whether the success rate and the error rate corresponding to the application is below a threshold. In some embodiments, the server computing device 200 is further configured to generate a notification in response to determining that the success rate and the error rate are below the threshold.

In some aspects, process 1000 can be implemented on a system for aggregating a dependency structure based on application logging data, application metadata, customer intent and journey, organizational structure, and operational support information. The system includes a server computing device 200 communicatively coupled to database and a user device 250 over a network 150. The server computing device 200 is configured to receive data from data sources using an application programming interface. The data including application logging data, application metadata, customer intent and journey data, organizational structure data, and operational support data. The server computing device 200 is also configured to, for each of at least one user, determine a start point and an end point corresponding to user activity on the network based on the received data.

Further, for each of the users, the server computing device 200 is configured to determine a task based on the start point and end point corresponding to the user activity. The server computing device 200 is also configured to, for each of the users, determine operations data corresponding to the user activity based on the received data. Further, the server computing device 200 is configured to, for each of the users, determine a dependency structure based on the task and the operations data corresponding to the user activity. The server computing device 200 is further configured to aggregate the dependency structure, the task, and the operations data for the users into a visualization. The server computing device 200 is also configured to generate for display the visualization on the user device 250.

In some embodiments, the server computing device 200 is further configured to identify ownership data corresponding to an application used by one of the users. In some embodiments, the server computing device 200 is further configured to determine a latency corresponding to the application. For example, in some embodiments, the server computing device 200 is further configured to determine whether the latency corresponding to the application is below a threshold. In some embodiments, the server computing device 200 is further configured to generate a notification in response to determining that the latency is below the threshold.

In other embodiments, the server computing device 200 is further configured to determine a success rate and an error rate corresponding to the application. For example, in some embodiments, the server computing device 200 is further configured to determine whether the success rate and the error rate corresponding to the application is below a threshold. In some embodiments, the server computing device 200 is further configured to generate a notification in response to determining that the success rate and the error rate are below the threshold.

Figure 11:
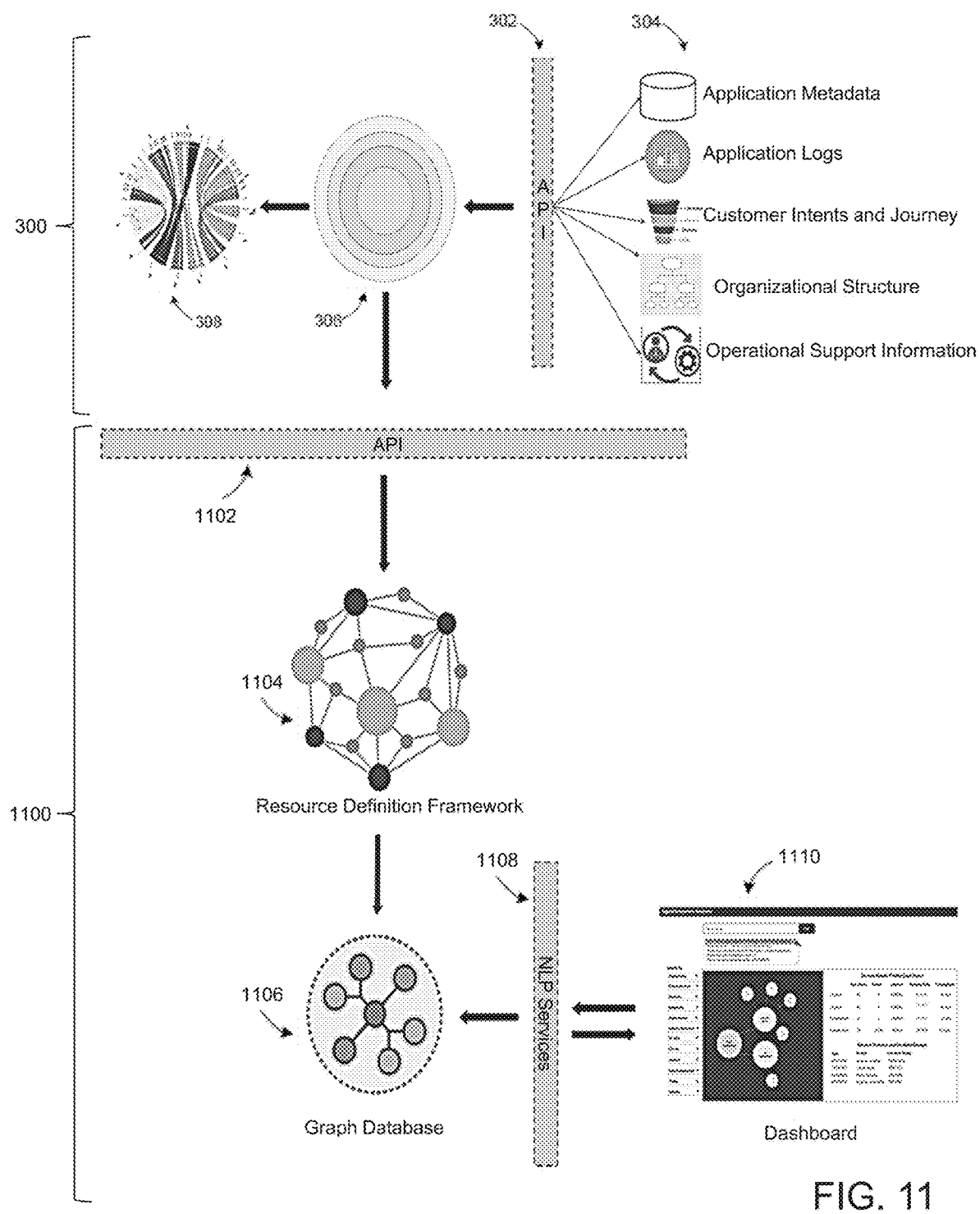
FIG. 11 is a diagram showing an exemplary AI-based framework for extending a digital ecosystem architecture that aggregates and visualizes a dependency structure.

Advantageously, in some embodiments the digital ecosystem architecture described above can be extended to incorporate artificial intelligence (AI)-based computing modules to enable more robust insights and increase the ease of use for end users. An exemplary AI-based framework 1100 for extending a digital ecosystem architecture 300 that aggregates and visualizes a dependency structure is illustrated in FIG. 11. The digital ecosystem architecture 300 is described in detail above with respect to FIG. 3—as previously explained, the architecture 300 provides an in-depth view of client digital journeys by stitching capabilities and their backend services to show the interconnectivity of legacy and digital assets. Digital ecosystem architecture 300 includes an API 302 that collects log data and application data from various data sources 304. Using the log data and application data, the digital ecosystem architecture 300 includes an aggregation 306 of the data to create a dependency structure between the front-end applications and back-end technologies and services. The digital ecosystem architecture 300 also includes a visualization 308 of the aggregation 306. The visualization 308 extends beyond experiences and is augmented by rich information about the applications like ownership, organizational alignment model, technology stack, technology lifecycle management, and operational metrics.

In the embodiment of FIG. 11, the digital ecosystem architecture 300 is integrated with an AI-based framework 1100 comprised of a plurality of computing modules that leverage advanced computing techniques to ingest the aggregation 306 generated by architecture 300 via API 1102 and identify additional hidden relationships and connections between the elements that comprise the aggregation 306. By analyzing the identified relationships with the data from the aggregation 306 using business knowledge, a Resource Definition Framework 1104 is created which is used to populate and hydrate knowledge graphs 1106 stored in a graph database. Once generated, the knowledge graphs 1106 can be queried by end users to discover new insights into the aggregation 306 data using a Natural Language Processing (NLP) Services interface 1108 that converts human-understandable question-and-answer-patterns provided via dashboard 1110 to system or graph system queries used to traverse the knowledge graph(s) and obtain result sets that can be presented to the end users as visualizations in dashboard 1110.

As can be appreciated, the knowledge graph serves as a bridge between business leaders/managers and digital ecosystems. Using a knowledge graph enables the system to understand the sentiment of user base on the customer journey and activities using dropoffs and errors. For example, 60% of customers may fail to complete an 'account opening' journey, and error codes are present between an account creation API and a backend database intended to store new record types. This is negatively impacting the end user's experience, tied to a user journey, where error rates are abnormal in one component of this application scope, operating outside of the norm based on application health metrics Digital Ecosystem Analytics collects routinely. A knowledge graph enables broader relationships within the data that was not previously visible in the relational data without direct queries. The knowledge graph also helps in identifying anomalies within the data and flagging them. The triples defined by Resource Definition Framework 1104 provide enriched analytics of the relationships with the data that was not previously available.

In some embodiments, Resource Definition Framework 1104 ingests the aggregation 306 received from architecture 300 and generates a plurality of subject-predicate-object triples that define a relationship between a parent and child and are used to create the knowledge graph(s) 1106. For example, an application resource that is dependent upon a back-end technology may be defined as a parent, while the back-end technology may be defined as a child of the parent. Resource Definition Framework 1104 generates one or more triples that capture this relationship between the resources for creation and/or updating of knowledge graph(s) with those triples.

Figure 12:
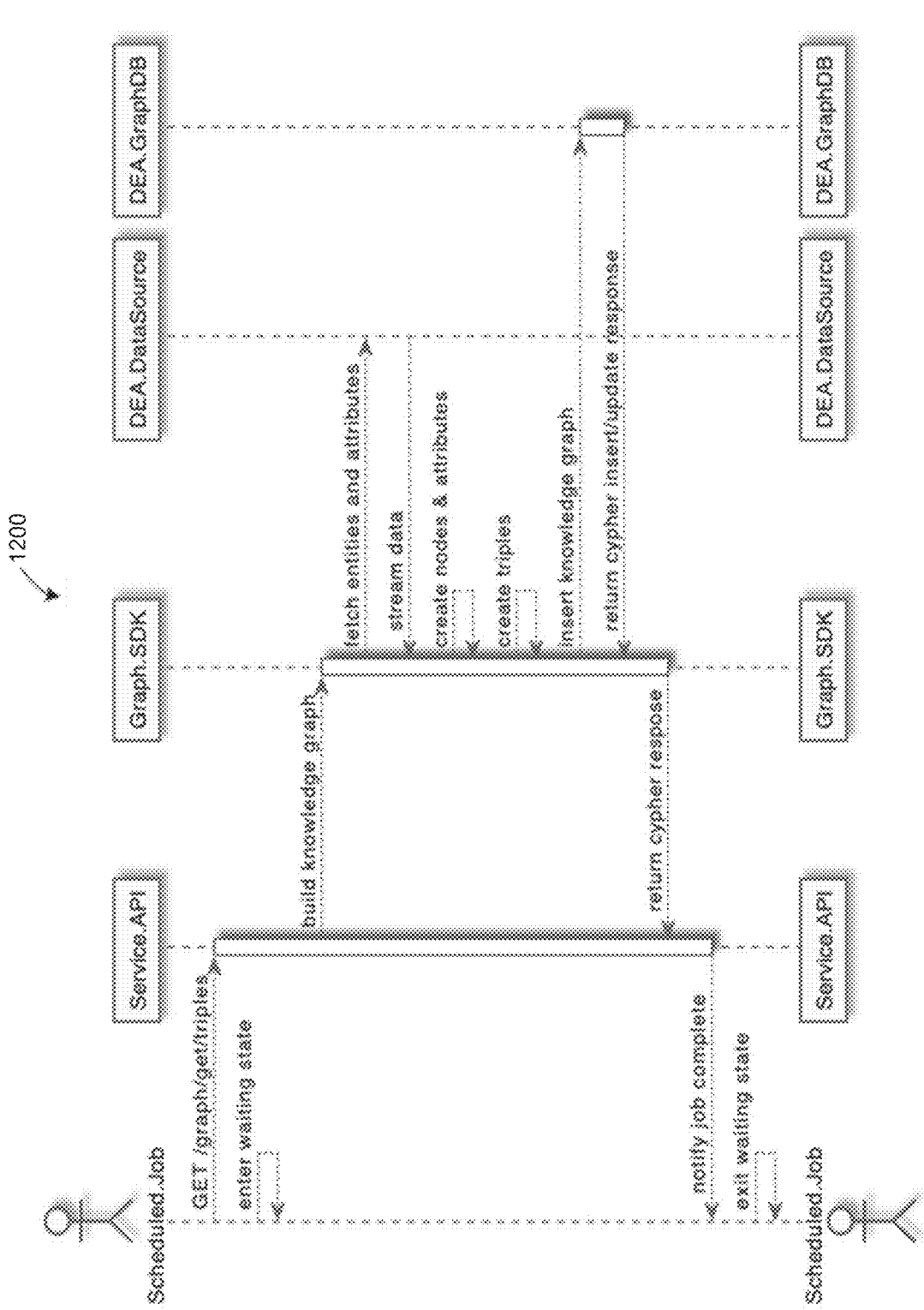
FIG. 12 is a diagram showing an exemplary process for knowledge graph hydration using a Resource Definition Framework.

An exemplary process 1200 for knowledge graph 1106 hydration using Resource Definition Framework 1104 is illustrated in FIG. 12. Process 1200 receives aggregation 306 data generated by architecture 300 via API 1102. Process 1200 can be performed by a server computing device 200. Resource Definition Framework 1104 creates nodes and attributes based upon the aggregation 306 data. Resource Definition Framework 1104 creates triples (e.g., subject-predicate-object) based upon the created nodes and attributes and builds a knowledge graph using the triples. Resource Definition Framework 1104 inserts the knowledge graph into knowledge graph database 1106. In some embodiments, scheduled jobs constantly analyze the aggregation 306 data sets to identify new parent and child relationships and create or update the knowledge graph with triples from those relationships.

Figure 13:
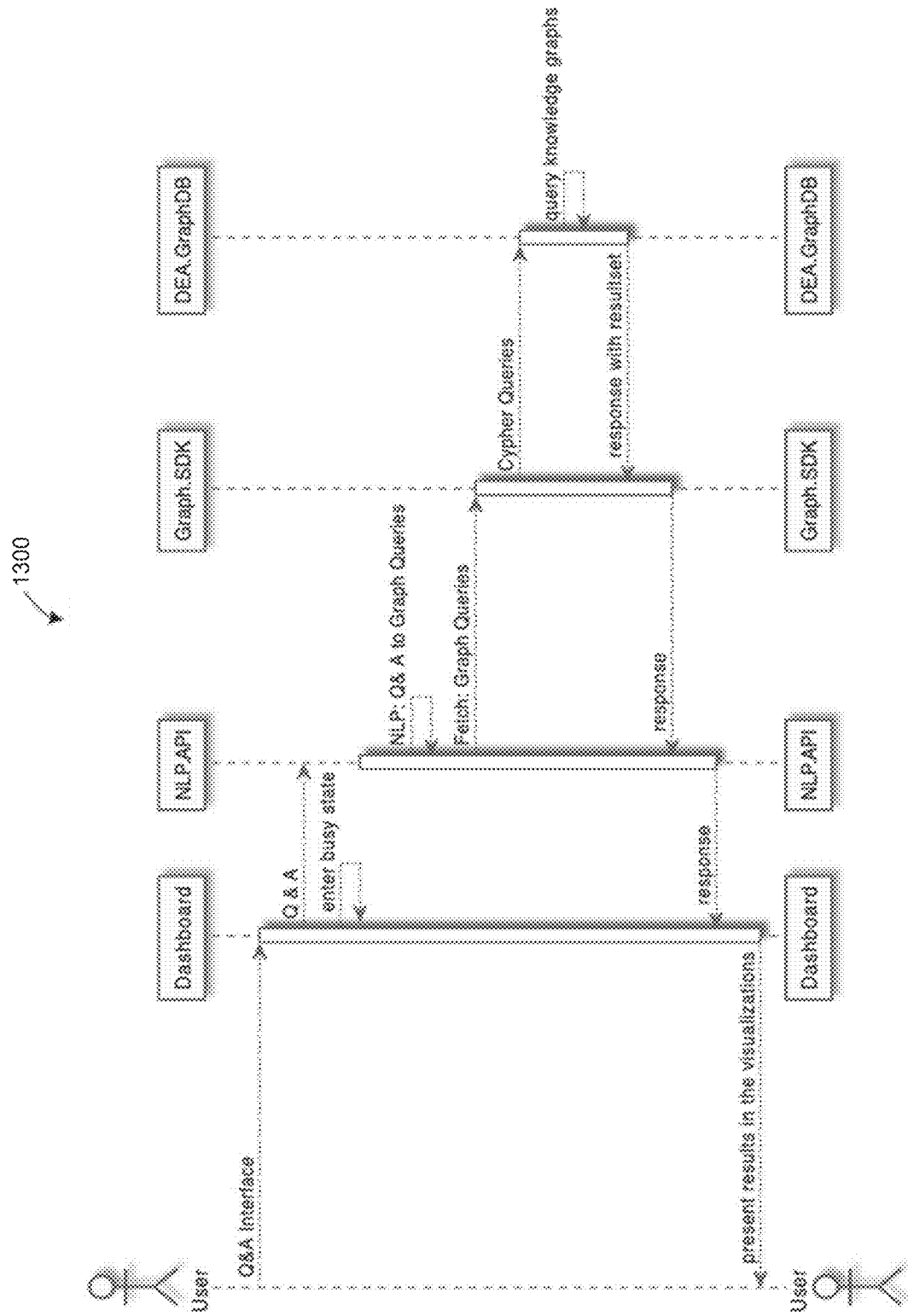
FIG. 13 is a diagram showing an exemplary process for knowledge graph querying using an NLP Services interface.

As mentioned above, after creation of knowledge graphs 1106 stored in the knowledge graph database, the database can be queried via dashboard 1110 using an NLP Services interface 1108. An exemplary process 1300 for knowledge graph 1106 querying using NLP Services interface 1108 is illustrated in FIG. 13. Process 1300 receives question-and-answer (Q&A) input from, e.g., an end user of dashboard 1110. Process 1300 can be performed by a server computing device 200 and dashboard 1110 can be displayed to end user via one or more user devices 250. NLP Services interface 1108 converts the Q&A input to graph queries which are used to traverse knowledge graphs 1106 in database to identify responsive data (e.g., entities, relationships) and return the response to dashboard 1110 for presentation to the end user via one or more visualizations. As can be appreciated, the system beneficially enables users to engage with multi-dimensional relationships represented in the knowledge graphs via a natural language Q&A pattern, instead of a linear flow model. Before users had to infer the contextual connection, but now the relationship is presented to the end user with the enriched context of the relationship.

Figure 14:
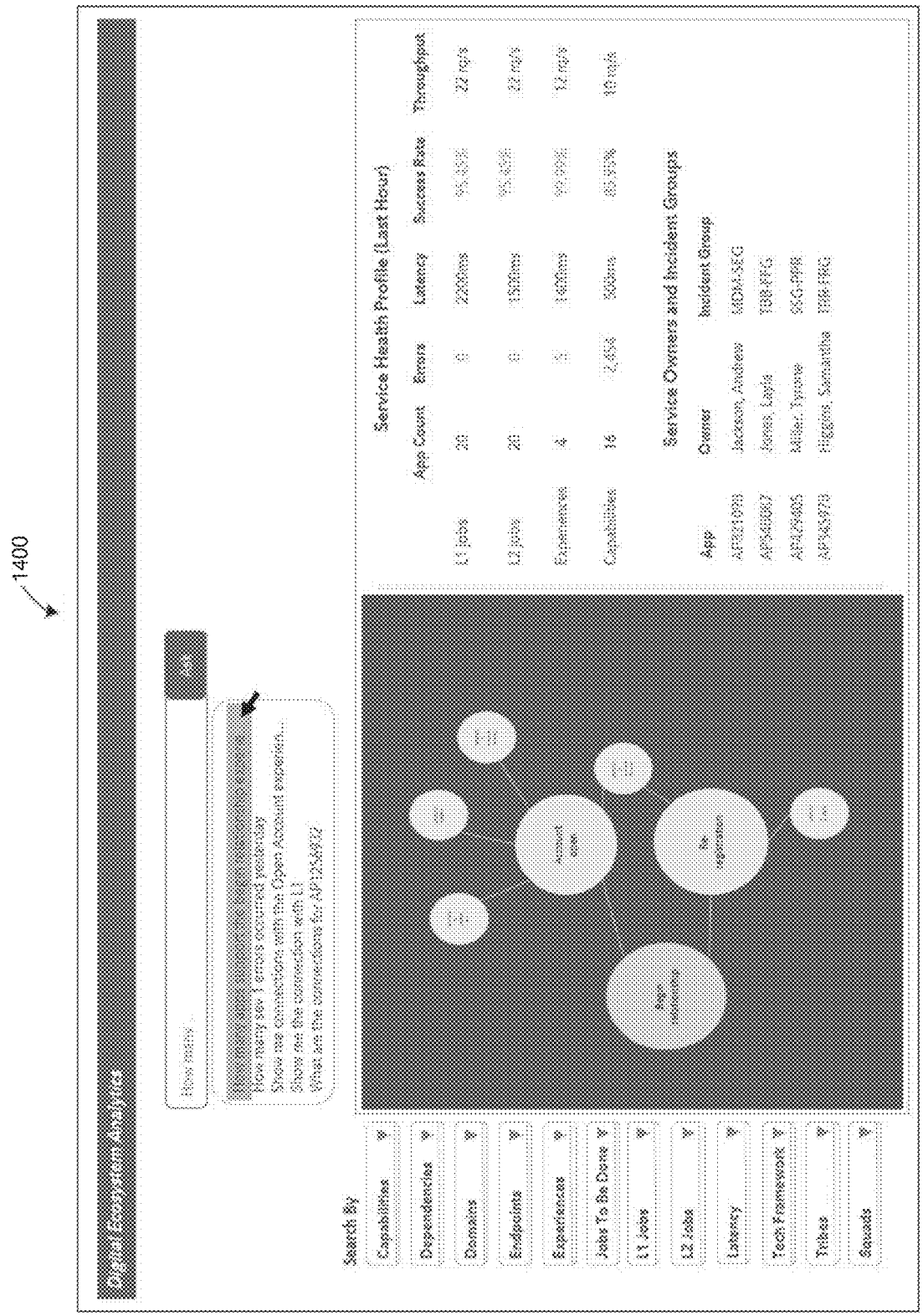
FIG. 14 is a diagram showing an exemplary visualization of knowledge graph data.

An exemplary visualization 1400 of knowledge graph data is illustrated in FIG. 14. The visualization 1400 enables the end users to understand broader relationships within the data that were not previously visible in the relational data without direct queries. The knowledge graph combined with the visualization can help end users investigate and understand complex relationships and dependencies within a digital ecosystem. For example, a user can employ the visualization to get answers to specific questions, such as:

What is the success rate of account opening journey today? The visualization 1400 provides that the success rate is 60%, derived from underlying system interactions, throughput, and success rates.

Why is the success rate of 'account opening' journey so low? Of ten known application dependencies involved with this journey, account creation API shows low success rate when calling DB layer to store record, vs. historical record. This is highlighted and displayed to the end user via visualization 1400 to investigate further.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method of generating and visualizing a knowledge graph using a dependency structure based on application logging data, application metadata, customer intent and journey, organizational structure, and operational support information, the method comprising:

analyzing, by a server computing device, an aggregated dependency structure for a computing ecosystem, the aggregated dependency structure based upon data from a plurality of data sources, wherein the data comprises application logging data, application metadata, customer intent and journey data, organizational structure data, and operational support data;

generating, by the server computing device, a knowledge graph based upon the analysis of the aggregated dependency structure, the knowledge graph comprising a plurality of nodes connected via one or more relationships;

traversing, by the server computing device, the knowledge graph to generate a result set responsive to a graph query, the graph query generated via conversion of a question-and-answer-pattern received from a remote computing device;

creating, by the server computing device, a visualization based upon the result set, the visualization comprising a graphical representation of at least a portion of the knowledge graph; and generating, by the server computing device, for display the visualization on a user device.

2. The computerized method of claim 1, wherein the server computing device receives the application logging data, application metadata, customer intent and journey data, organizational structure data, and operational support data periodically.

3. The computerized method of claim 1, wherein each node of the knowledge graph is associated with one or more of an application resource, a task, a customer intent and journey, or a back-end resource.

4. The computerized method of claim 3, wherein a connection between two nodes of the knowledge graph comprises a dependency.

5. The computerized method of claim 1, wherein each node of the knowledge graph comprises one or more attributes corresponding to a subject-predicate-object triple.

6. The computerized method of claim 1, wherein the server computing device converts the question-and-answer pattern into the graph query using a Natural Language Processing (NLP) interface.

7. The computerized method of claim 1, wherein the server computing device generates the aggregated dependency structure by:
- for each of a plurality of users, determining, by the server computing device, a start point and an end point corresponding to user activity on a networked system based on received data;
- for each of the plurality of users, determining, by the server computing device, a task based on the start point and end point corresponding to the user activity;
- for each of the plurality of users, determining, by the server computing device, operations data corresponding to the user activity based on the received data;
- for each of the plurality of users, determining, by the server computing device, a dependency structure based on the task and the operations data corresponding to the user activity;
- for each of the plurality of users, identifying, by the server computing device, an organizational group responsible for the task based on the operations data;
- for each of the plurality of users, identifying, by the server computing device, ownership data corresponding to an application used by a user of the plurality of users, including determining a latency corresponding to the application and when the latency is below a threshold, generating a notification; and
- aggregating, by the server computing device, the dependency structure, the task, the operations data, and the organizational group responsible for the task for the plurality of users into the aggregated dependency structure.

8. A system for generating and visualizing a knowledge graph using a dependency structure based on application logging data, application metadata, customer intent and journey, organizational structure, and operational support information, the system comprising a server computing device having a memory that stores computer-executable instructions and a processor that executes the computer-executable instructions to:
- analyze an aggregated dependency structure for a computing ecosystem, the aggregated dependency structure based upon data from a plurality of data sources, wherein the data comprises application logging data, application metadata, customer intent and journey data, organizational structure data, and operational support data;
- generate a knowledge graph based upon the analysis of the aggregated dependency structure, the knowledge graph comprising a plurality of nodes connected via one or more relationships;
- traverse the knowledge graph to generate a result set responsive to a graph query, the graph query generated via conversion of a question-and-answer-pattern received from a remote computing device;
- create a visualization based upon the result set, the visualization comprising a graphical representation of at least a portion of the knowledge graph; and
- generate, for display, the visualization on a user device.

9. The system of claim 8, wherein the server computing device receives the application logging data, application metadata, customer intent and journey data, organizational structure data, and operational support data periodically.

10. The system of claim 8, wherein each node of the knowledge graph is associated with one or more of an application resource, a task, a customer intent and journey, or a back-end resource.

11. The system of claim 10, wherein a connection between two nodes of the knowledge graph comprises a dependency.

12. The system of claim 8, wherein each node of the knowledge graph comprises one or more attributes corresponding to a subject-predicate-object triple.

13. The system of claim 8, wherein the server computing device converts the question-and-answer-pattern into the graph query using a Natural Language Processing (NLP) interface.

14. The system of claim 8, wherein the server computing device generates the aggregated dependency structure by:
- for each of a plurality of users, determining, by the server computing device, a start point and an end point corresponding to user activity on a networked system based on received data;
- for each of the plurality of users, determining, by the server computing device, a task based on the start point and end point corresponding to the user activity;
- for each of the plurality of users, determining, by the server computing device, operations data corresponding to the user activity based on the received data;
- for each of the plurality of users, determining, by the server computing device, a dependency structure based on the task and the operations data corresponding to the user activity;
- for each of the plurality of users, identifying, by the server computing device, an organizational group responsible for the task based on the operations data;
- for each of the plurality of users, identifying, by the server computing device, ownership data corresponding to an application used by a user of the plurality of users, including determining a latency corresponding to the application and when the latency is below a threshold, generating a notification; and
- aggregating, by the server computing device, the dependency structure, the task, the operations data, and the organizational group responsible for the task for the plurality of users into the aggregated dependency structure.

\* \* \* \* \*